US010829239B2

(12) United States Patent
Parsons

(10) Patent No.: US 10,829,239 B2
(45) Date of Patent: Nov. 10, 2020

(54) ELECTRICAL LOAD SHED TO INCREASE AVAILABLE AIRCRAFT POWER

(71) Applicant: Bell Helicopter Textron Inc., Fort Worth, TX (US)

(72) Inventor: Thomas Dewey Parsons, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 166 days.

(21) Appl. No.: 16/059,655

(22) Filed: Aug. 9, 2018

(65) Prior Publication Data

US 2020/0047911 A1    Feb. 13, 2020

(51) Int. Cl.
| | | |
|---|---|---|
| *B64D 41/00* | (2006.01) | |
| *B60R 16/03* | (2006.01) | |
| *H02B 1/20* | (2006.01) | |
| *B64C 27/04* | (2006.01) | |
| *H02P 101/30* | (2015.01) | |

(52) U.S. Cl.
CPC .............. *B64D 41/00* (2013.01); *B60R 16/03* (2013.01); *B64C 27/04* (2013.01); *H02B 1/20* (2013.01); *B64D 2221/00* (2013.01); *H02P 2101/30* (2015.01)

(58) Field of Classification Search
CPC .... B64D 41/00; B64D 2221/00; B64C 27/04; B60R 16/03; H02B 1/20; H02P 2101/30
See application file for complete search history.

(56) References Cited

U.S. PATENT DOCUMENTS

| | | | | |
|---|---|---|---|---|
| 4,317,177 A * | 2/1982 | Burnworth | ............. | H02H 7/062 |
| | | | | 244/194 |
| 6,242,881 B1 * | 6/2001 | Giordano | ................ | F02N 11/04 |
| | | | | 244/17.11 |
| 2015/0225089 A1 * | 8/2015 | Judge | ..................... | B64D 43/00 |
| | | | | 701/3 |

* cited by examiner

*Primary Examiner* — Yuhui R Pan
(74) *Attorney, Agent, or Firm* — Fogarty LLP

(57) ABSTRACT

Embodiments are directed to systems and methods for managing electrical load in an aircraft comprising a generator coupled to an aircraft engine, and a power distribution controller configured to monitor current engine operating parameters and to reduce an electrical load on the generator when the engine operating parameters reach a limit during specified aircraft operating conditions. The system may further comprise a non-essential electrical bus coupled to the generator, wherein the electrical load on the generator is reduced by disconnecting the non-essential bus from the generator. The generator may be coupled to the aircraft engine via an accessory gearbox or a transmission gearbox. The monitored current engine operating parameters comprise one or more of an engine torque, a gas generator RPM, and a temperature. The aircraft operating conditions may comprise one or more of a takeoff, a landing, or an engine failure.

16 Claims, 3 Drawing Sheets

ELECTRICAL LOAD SHED TO INCREASE AVAILABLE AIRCRAFT POWER

TECHNICAL FIELD

The present invention relates generally to the field of electrical load distribution in an aircraft and, more specifically, to a system that detects power demand and sheds electrical load from drive train to maximize power available.

BACKGROUND

Aircraft have generators that are coupled directly or indirectly to the aircraft engine(s) to provide power to electrical equipment, such communication equipment, navigation systems, lighting, etc. Many existing aircraft include systems for modifying the distribution of electrical power, such as removing power from certain electrical equipment, when a generator fails or other electrical system disruptions occur. However, existing aircraft do not modify electrical loads based upon engine loading considerations.

SUMMARY

Embodiments are directed to systems and methods for modifying electrical load on aircraft engines based upon power available. Control logic monitors the electrical load from a generator(s) on the engine accessory pad as well as the engine power demand. When maximum power demand is requested, the control logic temporarily sheds electrical load from the generator(s) to increase power available to the aircraft, thus increasing overall aircraft performance. The control logic integrates the following: monitoring of actual engine power available with respect to rated power available (e.g., compare actual engine torque, MGT, and RPM versus their respective limits), monitoring engine accessory pad electrical load extraction, detecting when maximum power is requested and automatically, or manually, begin load shedding when needed to provide additional power.

In one embodiment, a system comprises a generator coupled to an aircraft engine, and a power distribution controller configured to monitor current engine operating parameters and to reduce an electrical load on the generator when the engine operating parameters reach a limit during specified aircraft operating conditions. The system may further comprise a non-essential electrical bus coupled to the generator, wherein the electrical load on the generator is reduced by disconnecting the non-essential bus from the generator. The generator may be coupled to the aircraft engine via an accessory gearbox or a transmission gearbox. The monitored current engine operating parameters comprise one or more of an engine torque, a turbine RPM, and a temperature. The aircraft operating conditions comprise one or more of a takeoff, a landing, or an engine failure.

The electrical load on the generator may be automatically reduced by disconnecting non-essential electrical equipment from the generator. The power distribution controller may be further configured to notify an aircraft flight crew when the engine operating parameters reach a limit during the specified aircraft operating conditions, and to allow the flight crew to manually disconnect non-essential electrical equipment from the generator.

The system may further comprise a timer, wherein the electrical load on the generator is reduced by disconnecting non-essential electrical equipment from the generator for a predetermined duration and then reconnecting the non-essential electrical equipment to the generator.

In another embodiment, a method for managing electrical load in an aircraft comprises monitoring current aircraft engine operating parameters and reducing an electrical load on an engine generator when the engine operating parameters reach a limit during specified aircraft operating conditions. The method may further comprise reducing the electrical load on the generator by disconnecting a non-essential bus from the generator. The generator used in the method may be coupled to the aircraft engine via an accessory gearbox or via a transmission gearbox. The current engine operating parameters monitored by the method may comprise one or more of an engine torque, a turbine RPM, and a temperature. The aircraft operating conditions may comprise one or more of a takeoff, a landing, or an engine failure.

The method may further comprise automatically reducing the electrical load on the generator by disconnecting non-essential electrical equipment from the generator.

The method may further comprise notifying an aircraft flight crew when the engine operating parameters reach the limit during specified aircraft operating conditions and receiving a flight crew command to manually disconnect non-essential electrical equipment from the generator.

The method may further comprise disconnecting non-essential electrical equipment from the generator for a predetermined duration and reconnecting the non-essential electrical equipment to the generator.

BRIEF DESCRIPTION OF THE DRAWINGS

Figure 1:
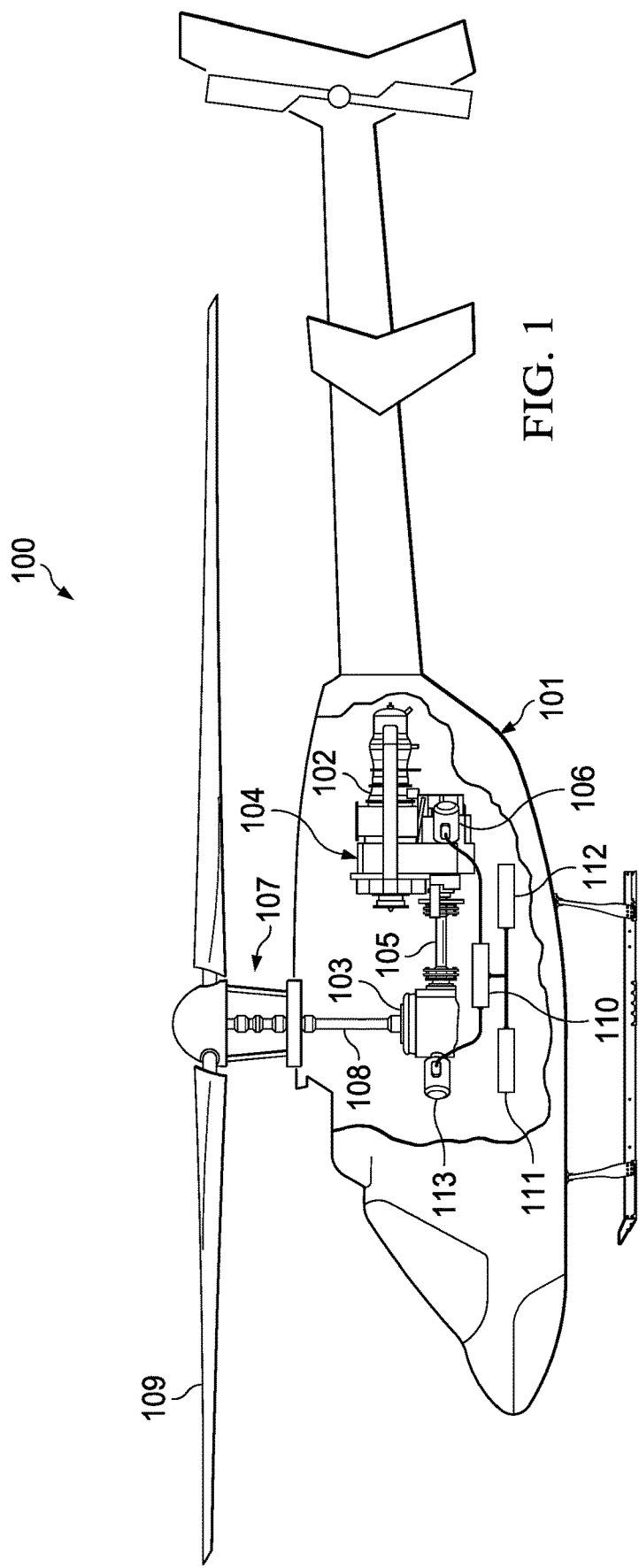

Having thus described the invention in general terms, reference will now be made to the accompanying drawings, which are not necessarily drawn to scale, and wherein:

FIG. 1 illustrates a helicopter with an engine and starter-generator system employing embodiments of the disclosed system and methods for managing electrical load shedding.

Figure 2:
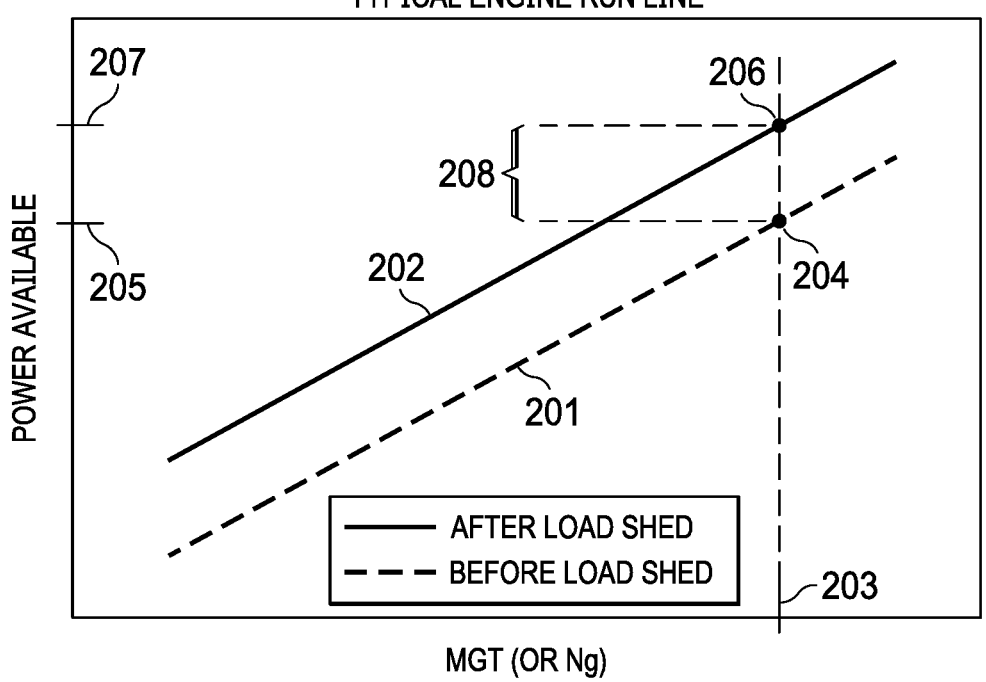

FIG. 2 illustrates a typical engine run line graph for a helicopter showing Measured Gas Temperature (MGT) or Ng gas generator speed versus power available.

Figure 3:
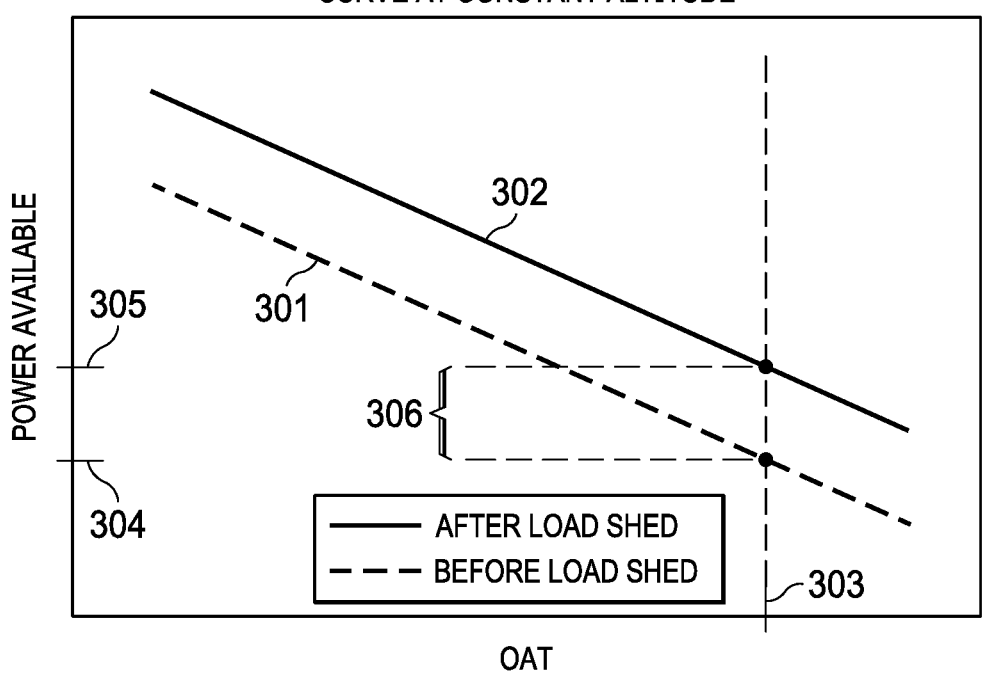

FIG. 3 illustrates a typical power available graph for a helicopter showing Outside Air Temperature (OAT) versus power available.

Figure 4:
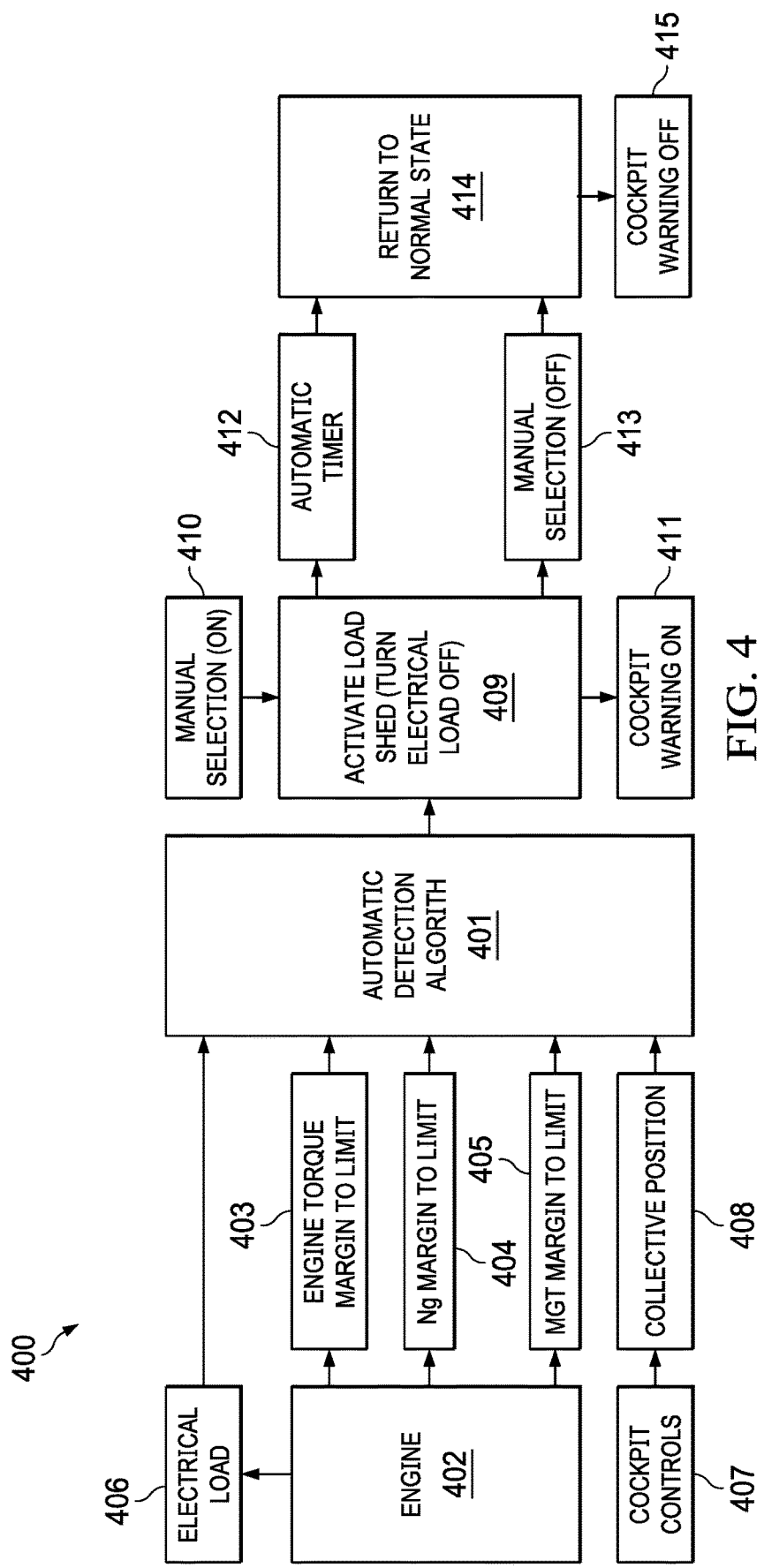

FIG. 4 is a block diagram illustrating operation of a system for managing electrical load in an aircraft.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1. illustrates a helicopter 100 comprising a fuselage 101, an engine 102, a main rotor gearbox 103 mechanically coupled to the engine 102 through an accessory gearbox 104. Accessory gearbox 104 has a drive-shaft 105 powering the main rotor gearbox 103 as well as a rear drive-shaft (not shown) powering the tail rotor. The accessory gearbox 104 has attachment points for the engine accessories, such starter-generator 106, a fuel pump, tachometers, etc. Rotor system 107 is mechanically coupled to the main rotor gearbox 103. The rotor system 107 comprises a mast 108 coupled to the main rotor gearbox 103 and rotor blades 109 coupled to the mast 108.

In one embodiment, starter-generator 106 can be used to start the engine 102. Once started, engine 102 causes electrical power generation through starter-generator 106 to provide electrical power to the helicopter 101 via power distribution controller 110, essential bus 111, non-essential bus 112, and other busses or lines. Essential bus 111 may provide electrical power to flight instruments, cockpit lighting, navigation equipment, communication equipment, and other essential flight or safety systems. Non-essential bus 112 may provide electrical power to high-load equipment, such as an air conditioning system, passenger lighting, radar system, galley equipment, or the like. Starter-generator 106 is driven by accessory gearbox 104 and generates sufficient electrical power capacity to serve electrical loads for helicopter 100. In other embodiments, a generator 113 may be installed on the aircraft transmission or main rotor gearbox 103.

In some cases, it can be desirable to provide a control system for an aircraft power plant that detects power demand and sheds electrical load from the engine accessory gearbox 104 and/or from main rotor gearbox 103 to maximize the power that is available to rotor system 107. Control logic monitors the electrical load from the starter-generator 106 as well as the engine power demand. When maximum power is requested, the control logic temporarily sheds electrical load from the starter-generator 106 to increase power available to the helicopter 100, thereby increasing overall performance.

Generator 106 or 113 creates a physical load on engine 102 either directly or through transmission 103 or an accessory gearbox depending upon where generator 106 or 113 is mounted. Control logic in power distribution controller 110 monitors the electrical load as well as the engine power demand. When a maximum power demand is requested, the power distribution controller 110 temporarily sheds electrical load from generator 106 or 113 to increase power available to the aircraft, thus increase overall aircraft performance.

The main power and accessory drive gear trains are enclosed in the accessory gearbox 104. The gearbox 104 is connected to engine 102 and all engine components, including the compressor, the turbine, and engine accessories are attached to the gearbox 104 case. In one embodiment, a two-stage helical and spur gear set is used to reduce rotational speed at the power turbine (N2) drive (approximately 33,000 RPM for a Rolls-Royce 250 engine, for example) to the output drive spline (approximately 6,000 RPM). A tachometer-generator and power turbine speed governor are mounted externally to gearbox 104 and are driven by the N2 gear train. The fuel pump, gas producer tachometer-generator, gas producer fuel control, and starter-generator 106 accessories are mounted externally to the gearbox 104 and are driven by the gas producer turbine (N1 or Ng) (at approximately 51,000 RPM). When engine 102 is powering the rotor system 107, the N2 RPM and hence rotor RPM, is kept constant by the action of an N2 governor. The N2 governor will cause a fuel control unit to alter fuel flow to vary the Ng RPM to suit changing power (torque) requirements.

The N2 gear train and turbine are not mechanically tied to the NG gear assembly. The N2 turbine is turned by the energy of the expanding hot gas delivered to it by the Ng gear train. The purpose of the N2 gear train is to convert the kinetic energy produced by the motion of the N2 rotor to usable shaft horse power to sustain helicopter flight. The compressor is directly driven by the gas producer turbine (Ng). The power turbine (N2) drives the engine power-takeoff gear shaft through a reduction gear train. While the engine 102 is powering the rotor system 107, the N2 RPM, and hence rotor RPM, is kept constant by the action of an N2 governor. The N2 governor causes the fuel control unit to alter fuel flow to vary the Ng RPM to suit the changing power (torque) requirements.

The starter-generator 106 puts a physical load on engine 102. For example, a typical starter-generator may provide 200 Amps current at 28. Vdc, which corresponds to 5.6 kW ($P=I \times V$). If the starter-generator 106 operates at 70 percent efficiency, then 8 kW (i.e., 5.6 kW±70%) is required to generate the required 200 Amp/28 Vdc output. This corresponds to 10.7 SHP that would be required from the accessory gearbox 104 to drive the starter-generator 106 (wherein 1 SHP=0.746 kW). In this example, if the generator load was turned off, it would be possible to gain 10.7 SHP at the accessory gearbox. Given that power extraction off the Ng spool typically results in 1.5 to 2 times installation loss at the N2 output shaft, for this example, up to 20 SHP could be gained by removing the generator load.

Although the example embodiments shown in FIG. 1 are for a helicopter 100, it will be understood that a power distribution controller system may be used with any aircraft, including any fixed-wing, rotorcraft, tiltrotor, commercial, military, or civilian aircraft having one or more engine.

FIG. 2 illustrates a typical engine run line graph for a helicopter wherein the x-axis represents Measured Gas Temperature (MGT) or Ng gas generator speed and the y-axis represents the power available. Graphs for two different operating conditions are shown. Graph 201 illustrates an example plot for power available versus MGT or Ng speed when the helicopter's starter-generator is supporting a full electrical load. On the other hand, graph 202 illustrates an example plot for power available versus MGT or Ng speed when the helicopter's starter-generator has shed some or all electrical load. Before load shed, as the pilot increases collective or decreases collective (i.e., increase/decrease MGT or Ng), the helicopter's power available moves along line 201. After load shedding, the helicopter's power available moves along line 202 as the pilot increases collective or decreases collective.

Before generator load shed, for a given MGT or Ng 203, the helicopter operates at point 204 with the power available indicated by 205. After generator load shed, for the same MGT or Ng 203, the helicopter operates at point 206 with the power available indicated by 207. As a result of shedding electrical load, the extra power available at MGT or Ng 203 is power differential 208 as shown by the range between operating points 204 and 206. In the example scenario described above, if a 28. Vdc generator can shed 200 Amps, then the extra power available 208 would be 20 SHP. This gain in power available corresponds to the helicopter's ability to lift more weight and/or to fly at a faster airspeed in level flight. In an example embodiment, 1 SHP corresponds to 6.5 pounds gross weight. This means that by gaining 20 SHP through electrical load shedding, the helicopter would be able to lift an extra 130 pounds using the excess power available. It would be advantageous to use electrical load shedding when the engine is operating at peak power, such as at a maximum MGT or Ng. Although the engine cannot increase MGT or Ng, it would be possible to gain additional power by shedding electrical load.

FIG. 3 illustrates a typical engine power available graph for a helicopter at a fixed altitude wherein the x-axis represents changes in Outside Air Temperature (OAT) and the y-axis represents power available. Generally, as OAT increases, the power available decreases. Graph 301 represents the power available with a full electrical load, and graph 302 represents the power available after some or all of the electrical load has been shed. For example, on a hot day at sea level, the OAT is 303 and the power 304 is available at this temperature. However, if some or all of the electrical load is removed, then the power available would be 305, resulting is an increased power available shown by range 306. The OAT is out of the pilot or helicopter's control and cannot be changed to gain extra power available; however, electrical load may be manually or automatically reduced to achieve excess power available 306.

FIG. 4 is a block diagram illustrating operation of a system 400 for managing electrical load in an aircraft, such as helicopter. Automatic detection algorithm 401 monitors engine parameters, flight conditions, and electrical load and determines when electrical load shedding would be advantageous. Automatic detection algorithm 401 may be executed by a power distribution controller 110 (FIG. 1), a flight management system, electronic engine control, or other processor in the aircraft. Automatic detection algorithm 401 receives data and status information from engine 402. The engine parameter inputs include, for example, an engine torque margin relative to a torque limit 403, an Ng margin to an RPM limit 404, or an MGT margin to a temperature limit 405. The engine parameters may be measured, for example, using sensors on engine 402 and/or an accessory gearbox and/or engine transmission. When one of these parameters reach an operating limit, such as an engine torque, RPM, or temperature limit, then automatic detection algorithm 401 would be aware that the engine is providing maximum power under current conditions.

Automatic detection algorithm 401 monitors the electrical load 406 on engine 402. The electrical load may be determined using the current output from a starter-generator, for example. The electrical load measurement indicates to automatic detection algorithm 401 whether electrical load shedding is available and, if so, to what extent. For example, the voltage and current output of the starter-generator may be used to determine a potential shaft horsepower amount that could be available if electrical load was shed by the starter-generator.

Automatic detection algorithm 401 may also monitor the cockpit controls 407, such as the position of the collective 408. Other cockpit controls and instruments may also be monitored by automatic detection algorithm 401 in other embodiments, such as cyclic position, control stick, throttle position, engine position (e.g., in a tiltrotor aircraft), or the like. Automatic detection algorithm 401 may further track current flight conditions, such as whether the aircraft is stopped, taxiing, taking off, in-flight, or landing. For example, the automatic detection algorithm 401 may receive inputs from landing gear position sensors, weight-on-wheels sensors, an air data computer (ADC), a radar altimeter, or the like.

Based upon the engine, electrical load, flight controls, and/or other flight condition inputs, automatic detection algorithm 401 evaluates whether electrical load shedding should be advised, recommended, or automatically triggered. For example, based upon current barometric altitude, radar altitude, OAT, MGT, Ng RPM, engine torque, and/or electrical load, the automatic detection algorithm 401 in a power distribution controller may determine that the aircraft is operating at a maximum available power under current conditions, but further determine that additional power would be available if electrical load was removed from the starter-generator. At that point, the algorithm 401 triggers an output to activate electrical load shed 409. Electrical load shed 409 may be an automatic process that turns off electrical devices or otherwise disconnects the electrical devices from the starter-generator without flight crew interaction. Alternatively, electrical load shed 409 may be a semi-automatic or manual process that disconnects the electrical devices from the starter-generator either after flight crew approval or after flight crew selection of particular equipment to be disconnected. Manual approval or selection of load shedding may be accomplished via a cockpit switch or control 410 that is selected by the flight crew.

The particular equipment or devices to be turned off or disconnected during electrical load shed may be selected based upon electrical load. For example, disconnecting specific high-load equipment, such as an air conditioning system, a radar system, galley equipment (e.g., refrigerator, coffee maker), battery charging system, or the like. Alternatively, entire groups of equipment may be turned off or disconnected during electrical load shed, such as by disconnecting a non-essential electrical bus and/or auxiliary electrical busses. This would allow essential equipment, such as flight instruments, cockpit lighting, and navigation and communication equipment that is powered by an essential bus, to continue operating during electrical load shed. One or more cockpit warning lights 411 may provide notifications and warnings to the flight crew. For example, cockpit warning 411 may be used to alert the flight crew that load shed has been activated, or that load shedding is recommended. Cockpit warning 411 may further indicate the current status of particular equipment or electrical busses being on/off or connected/disconnected, for example.

The electrical load shedding event may last for a specific period of time, such as until an automatic timer 412 expires. Once electrical load shed is selected—either manually or automatically—the designated equipment and/or busses will remain disconnected from the starter-generator for a preset amount of time, such as for 30 seconds, 1 minute, 5 minutes, etc. The duration of automatic timer 412 may be preset for all load shed events or may be a duration selected based upon current flight conditions or other considerations. Alternatively, the electrical load shedding event may last until the flight crew terminates the event using a manual selection switch or control 413. Once electrical load shed is selected—either manually or automatically—the designated equipment and/or busses may remain disconnected from the starter-generator until manually selected by the flight crew to reconnect the equipment and/or busses. In some embodiments, manual off selection 413 may be used to prematurely terminate automatic timer 412 before the preset duration has expired. This would provide the flight crew with a safety factor that allows them to reconnect equipment when needed in an emergency, for example.

Once the electrical load shed event has terminated, the aircraft electrical system and starter-generator will return to a normal operating state 414. As noted above, normal electrical operations may be selected either automatically at the end of the timed period 412 or manually 413. When normal operations resume, the cockpit warning lights may be turned off 415. The cockpit lights 415 may also provide notifications and warnings to the flight crew that normal operations have resumed and/or that certain equipment or busses are connected to the electrical system. Normal operation may be indicated, for example, by turning off a "load shed" warning and/or by illuminating a "normal operation" indicator.

In some embodiments, multiple starter-generators may be used for an aircraft that has multiple engines. In such aircraft, the load shedding may comprise reducing or eliminating the electrical load from one or more starter-generator while leaving normal operation for the starter-generator on other engines. This would allow a situation in which load shedding is used to increase power available for some but not all engines. Alternatively, the electrical load may be reduced or eliminated across all starter-generators to increase the power available across all engines.

In other embodiments, a starter-generator 113 may be located on an aircraft transmission or main rotor gearbox 103 (FIG. 1). Electrical load shedding may also be employed in this configuration in a similar manner as described above for an accessory-gearbox-mounted starter-generator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system, comprising:
a generator coupled to an aircraft engine; and
a power distribution controller configured to monitor current engine operating parameters and to reduce an electrical load on the generator when the engine operating parameters reach a limit during specified aircraft operating conditions in order to increase power available to the aircraft, wherein the power distribution controller is further configured to notify an aircraft flight crew when the engine operating parameters reach a limit during the specified aircraft operating conditions, and to allow the flight crew to manually disconnect and reconnect non-essential electrical equipment from the generator.

2. The system of claim 1, further comprising:
a non-essential electrical bus coupled to the generator, wherein the electrical load on the generator is reduced by disconnecting the non-essential bus from the generator.

3. The system of claim 1, wherein the generator is coupled to the aircraft engine via an accessory gearbox.

4. The system of claim 1, wherein the generator is coupled to the aircraft engine via a transmission gearbox.

5. The system of claim 1, wherein the electrical load on the generator is automatically reduced by disconnecting non-essential electrical equipment from the generator.

6. The system of claim 1, further comprising a timer, wherein the electrical load on the generator is reduced by disconnecting non-essential electrical equipment from the generator for a predetermined duration and then reconnecting the non-essential electrical equipment to the generator.

7. The system of claim 1, wherein the monitored current engine operating parameters comprise one or more of an engine torque, a gas generator RPM, and a temperature.

8. The system of claim 1, wherein the aircraft operating conditions are used to control electrical load, comprising one or more of a takeoff, a landing, or an engine failure.

9. A method for managing electrical load in an aircraft, comprising:
monitoring current aircraft engine operating parameters;
notifying an aircraft flight crew when the engine operating parameters reach a limit during specified aircraft operating conditions;
receiving a flight crew command to manually disconnect and reconnect non-essential electrical equipment from an engine generator; and
reducing an electrical load on the engine generator in order to increase power available to the aircraft.

10. The method of claim 9, further comprising:
reducing the electrical load on the generator by disconnecting a non-essential bus from the generator.

11. The method of claim 9, wherein the generator is coupled to the aircraft engine via an accessory gearbox.

12. The method of claim 9, wherein the generator is coupled to the aircraft engine via a transmission gearbox.

13. The method of claim 9, further comprising:
automatically reducing the electrical load on the generator by disconnecting non-essential electrical equipment from the generator.

14. The method of claim 9, further comprising:
disconnecting non-essential electrical equipment from the generator for a predetermined duration; and
reconnecting the non-essential electrical equipment to the generator.

15. The method of claim 9, wherein the monitored current engine operating parameters comprise one or more of an engine torque, a gas generator RPM, and a temperature.

16. The method of claim 9, wherein the aircraft operating conditions are used to control electrical load, comprising one or more of a takeoff, a landing, or an engine failure.

* * * * *